Aug. 4, 1925.
W. G. RUGGLES ET AL
1,548,100
BEATER FOR LIQUIDS
Filed March 27, 1924
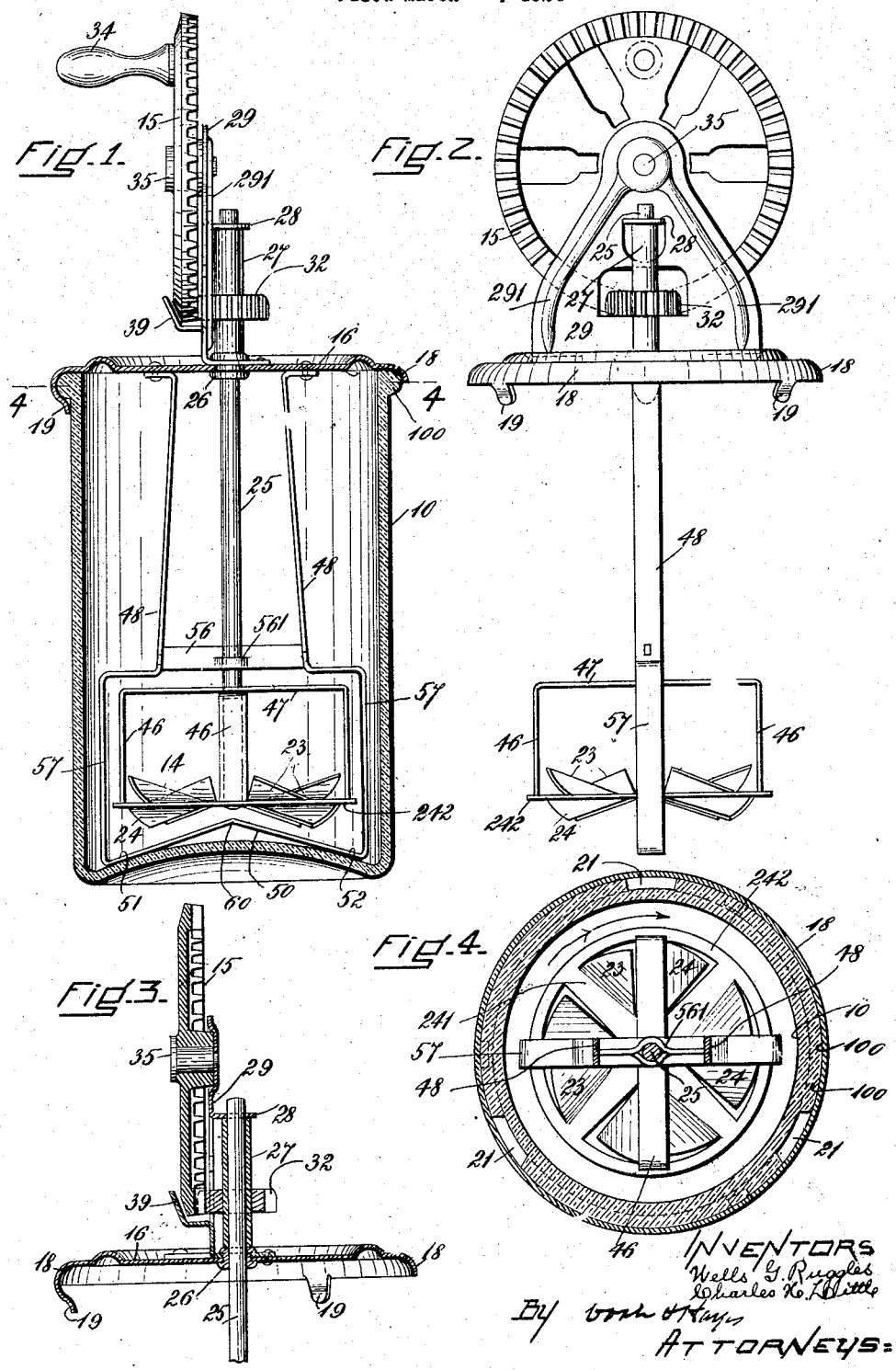

Patented Aug. 4, 1925.

1,548,100

UNITED STATES PATENT OFFICE.

WELLS G. RUGGLES, OF QUINCY, AND CHARLES H. LITTLE, OF MELROSE, MASSACHUSETTS, ASSIGNORS TO DOVER STAMPING & MANUFACTURING COMPANY, OF CAMBRIDGE, MASSACHUSETTS, A CORPORATION OF MASSACHUSETTS.

BEATER FOR LIQUIDS.

Application filed March 27, 1924. Serial No. 702,282.

*To all whom it may concern:*

Be it known that we, WELLS G. RUGGLES, of Quincy, in the county of Norfolk and State of Massachusetts, and CHARLES H. LITTLE, of Melrose, in the county of Middlesex and said State, citizens of the United States, have invented a new and useful Improvement in Beaters for Liquids, of which the following is a specification.

Our invention relates to apparatus for beating eggs, cream or the like with maximum efficiency and which may be used with a specially-constructed receptacle or otherwise as desired.

It consists in a new and useful improvement in an arrangement of elements whereby while in use the liquid acted upon is driven in several directions and is so agitated as to become thoroughly broken up and aerated in a very short time. While egg beaters and the like are very well known, it is believed that because of the peculiar construction of our beater and its elements, much more thorough mixing and aeration of the liquid can be secured in a given time than with any other beater known.

In the drawings which illustrate the preferred embodiment of our invention—

Figure 1 is a vertical section of the improved beating apparatus and its receptacle.

Fig. 2 is an elevation showing the beating mechanism alone.

Fig. 3 is a vertical section of the mechanism operating the agitator or beater, and Fig. 4 is a sectional plan on the line 4—4 of Fig. 1.

10 is a container which is preferably used with our beater and which preferably has a rim or bead 100 at its top edge.

16 is a plate which forms a cover for the container 10 and also a support for the actuating mechanism by which the beating apparatus is operated. This actuating mechanism comprises an upright 29 which is made of sheet metal and provided with strengthening ribs 291 struck therefrom. This upright has mounted near its upper end a stud 35 on which turns a gear 15 having a handle 34 with which to rotate it. From this upright 29 is struck a lug 28 at right angles thereto and which serves as a journal for a vertical shaft 25. Being made of sheet metal this support is very light not adding materially to the weight of the device and yet being of sufficient strength to perform its function of supporting the rotary members mounted thereon. The lip 39 is of such character that it can be easily adjusted by bending should it be necessary so to do in case of any wear on the part of the gear 15 or its bearing. A sleeve 27 rests between the lug 28 and an eyelet 26 which passes through the plate 16 and serves as a support and bearing for the sleeve 27. This sleeve carries a pinion 32 in mesh with the gear 15 and the sleeve 27 is shrunk or otherwise attached to the shaft 25 so that it supports the shaft 25, and the rotation of the pinion 32 will rotate the shaft 25. There is also struck outwardly and upwardly from the opposite side of the support 29 a lip-like lug 39 the upward portion of which lies behind the gear 15 so that the gear 15 cannot get out of mesh with the pinion 32 as it might after much wear or hard usage.

The shaft 25 carries at its lower end an agitator 14 and also a series of cutter blades 46. The agitator is in the form of a circular plate having a rim 242 and flat spokes 241 connecting the rim with the centre of the plate. Carried by said spokes and preferably integral therewith are agitating blades 23 and 24 which are bent alternately upwardly and downwardly from the said spokes, thus forming passages through the agitator. These alternately upwardly and downwardly bent blades 23 and 24 all face operatively in the same direction, so that they will all positively engage the substance to be agitated when the agitator is rotated in either direction. Thus if the agitator is rotated clockwise, or in the direction denoted by the arrow in Fig. 4, the blades 23 will force the liquid downward and the blades 24 will force it upward; and if the agitator be rotated in an anti-clockwise direction the blades 23 will force the liquid upward and the blades 24 will force it downward, so that the streams of liquid (as eggs, cream or other like substances) will strike each other and intermingle. Moreover, as the surfaces of these blades are generally operating at an acute angle to the surface of the plate they will in their rotation tend to cause cross currents of the liquid from the center toward the periphery of the plate, so that a more violent agitation of the liquid will be caused than in any beater now known to us.

The cutter blades comprise thin vertical portions 46 and horizontal portions 47 which are attached to the agitator 14 so that these cutter blades rotate with the agitator 14. Thus the agitator and cutter blades together form a unit which is rotated by the rotation of the shaft 25.

To stiffen the rotary structure and cooperate with the cutter blades we provide a thin stationary frame which is hung from the under side of the cover 16. This frame comprises substantially vertical members 48 which are braced by a cross bar 56 and are bent outwardly below the cross bar and just above and parallel to the horizontal portions 47 of the cutter blades and then downwardly as at 57 parallel to the vertical portions 46 of the blades. The lower ends of these vertical portions 57 are connected by a bar 50 which is bent upwardly at its middle 60 to form supports 51, 52 which may rest on the bottom of the container 10 or be used to support the agitator in an ordinary bowl if the container 10 be not used. The cross bar 56 is split as at 561 (see Figs. 1 and 4) and its slotted portions are bent outwardly in opposite directions to form a bearing for the shaft 25.

It will be noted that by this construction not only do the vertical portions 57 of the frame assist materially in the breaking up or aeration of the liquid but the horizontal portions and the crossbar 56 also are instrumental for the same purpose, cooperating as they do with the horizontal portions of the cutter blades.

As it is desirable that the plate or cover 16 shall be firmly attached to the container 10 during the beating operation, we provide the plate 16 with a lip 18 which fits over the thickened rim 100 at the top of the container and at certain portions about the circumference of this lip we provide depending lugs 19. We also provide the container with slots 21 in its rim 100, these slots being equal in number with, and suitably placed to register with the lugs 19, the rim of the container and the lip 18 fitting each other so that the plate 16 carrying the beater mechanism may fit tightly over the top of the container, the lugs 19 fitting into the slots 21. When the lugs and slots are so placed the plate 16 and the parts which it carries may be turned in a horizontal plane so that the lugs will pass under the rim 100 and hold the plate 16 in place as shown in Fig. 1.

In operation it will be noted that if the agitator is turned in the direction of the arrow (Fig. 4) the upbent blades 23 will strike the liquid and throw it down and the downbent blades 24 will throw the liquid up. Moreover, the inclined forward edges of the blades will also influence the course of the liquid. This will cause a thorough agitation of the liquid and will beat into it considerable air. Moreover, the cutter blades will assist in swirling the liquid about in the container, while the vertical parts of the frame being stationary will in a measure influence this swirling action so that these various parts will all of them cooperate in beating up the liquid.

This beater is particularly adapted for egg beating, because of the cooperation of the parts 57 and 48 which will cause a disintegration of a viscous or stringy liquid such as the white of an egg. It has been found by experience that eggs or cream will be whipped by this beater in a surprisingly short time due we believe to the combined action of this agitator with its oppositely-bent blades, the cutter blades and the frame. Moreover, owing to the simplicity of its construction its parts may be struck from sheet metal and put together at small expense.

In Fig. 4 spokes 241 are shown slightly narrower at one end than at the other, the narrow ends as shown being where they join the rim 242 and the wider ends where they join the central portion of the disk. As a result the line of the blade which is bent up or down from each spoke is not coincident with a radius of the disk, and a blade therefore bent along this line as shown tends not only to drive the liquid through the passage formed by the striking out of the blade, but to force the liquid outwardly from the center of the disk so that in its rotation the liquid is constantly being drawn from the center of the disk to take the place of that forced outwardly from its edge. This action causes a much more thorough circulation and beating up of the liquid than when the blades are bent along a radial line.

What we claim as our invention is:—

1. In a beater or aerator, the combination with an agitator comprising vertical cutter blades and a horizontal wheel having radial spokes and inclined radial cutter blades carried by said spokes, said radial cutter blades being reversely bent so that they extend alternately above and below said spokes and all face operatively in the same direction and are thereby adapted to cause opposing upward and downward currents in the liquid being beaten and aerated, combined with means for supporting and rotating said agitator.

2. A device of the kind described comprising a container, a cover therefor, a beater mechanism comprising a shaft depending therefrom, and means for operating said beater mechanism comprising a support of thin metal located on the upper side of said cover, a turnable gear mounted thereon, and a pinion mounted on said shaft in mesh with said gear, said support having a lip struck therefrom, the outer end of said lip being located to keep said gear in mesh with said pinion.

3. In a device of the kind described, a beater mechanism comprising a shaft and means for turning it, and an agitator carried by said shaft, said agitator comprising a disk having blades struck therefrom to form passages therethrough, said disk having a central portion, a rim and spokes connecting said central portion and said rim and carrying said blades, said spokes being narrower at one end than at the other whereby the edge of said blades where they join said spokes will lie at an angle to a radius of said disk and on rotation through a liquid will tend to throw said liquid in a direction across the path of rotation of said agitator as well as through said passages.

4. A device of the kind described comprising a vertical shaft and means for supporting it, an agitator attached to said shaft to be rotated thereby, a stationary frame hung from said shaft-supporting means and comprising vertical members and a cross bar connecting said vertical members, said cross bar being slit horizontally and bent outwardly in opposite directions at said slit, said shaft passing through said slit and the oppositely-bent portion of said cross bar forming a bearing for said shaft.

5. In a beater and aerator, the combination with a plate adapted to serve as a cover for a vessel, of an upright standard fixed to said plate, a driving gear wheel supported by said standard, a sleeve fixed to said standard, a vertical shaft journalled in said sleeve and provided near its top with a pinion meshing with said gear wheel, a depending frame fixed to said plate and having a steadying bearing for the lower part of said shaft, and an agitator carried by said shaft.

WELLS G. RUGGLES.
CHARLES H. LITTLE.